United States Patent
Webster et al.

(10) Patent No.: US 8,139,544 B1
(45) Date of Patent: Mar. 20, 2012

(54) PILOT TONE PROCESSING SYSTEMS AND METHODS

(75) Inventors: Mark A. Webster, Indian Harbor Beach, FL (US); Michael J. Seals, Melbourne, FL (US)

(73) Assignee: Intellectual Ventures I LLC, Wilmington, DE (US)

( * ) Notice: Subject to any disclaimer, the term of this patent is extended or adjusted under 35 U.S.C. 154(b) by 986 days.

(21) Appl. No.: 11/121,743

(22) Filed: May 4, 2005

Related U.S. Application Data

(60) Provisional application No. 60/592,748, filed on Jul. 30, 2004.

(51) Int. Cl.
*H04W 4/00* (2009.01)
*H04J 11/00* (2006.01)

(52) U.S. Cl. .................. 370/334; 370/203; 370/208

(58) Field of Classification Search .............. 370/334, 370/208, 335, 203, 148, 206, 204; 455/502, 455/245.1, 101, 134, 562.1; 375/340, 267; 375/260; 348/731
See application file for complete search history.

(56) References Cited

U.S. PATENT DOCUMENTS

| | | | |
|---|---|---|---|
| 6,445,425 B1 * | 9/2002 | Limberg ................. | 348/731 |
| 6,754,195 B2 * | 6/2004 | Webster et al. .......... | 370/335 |
| 6,768,714 B1 * | 7/2004 | Heinonen et al. ........ | 370/208 |
| 6,785,341 B2 | 8/2004 | Walton et al. ........... | 375/267 |
| 6,850,481 B2 * | 2/2005 | Wu et al. ................ | 370/208 |
| 6,862,271 B2 | 3/2005 | Medvedev et al. ...... | 370/329 |
| 7,564,917 B2 * | 7/2009 | Mitran .................... | 375/267 |
| 7,848,438 B2 * | 12/2010 | Baum et al. ............. | 375/260 |
| 2002/0191535 A1 * | 12/2002 | Sugiyama et al. ....... | 370/208 |
| 2003/0012308 A1 * | 1/2003 | Sampath et al. ......... | 375/340 |
| 2003/0058787 A1 * | 3/2003 | Vandenameele-Lepla | 370/206 |
| 2003/0114127 A1 * | 6/2003 | Baldwin ................. | 455/245.1 |
| 2003/0128656 A1 * | 7/2003 | Scarpa ................... | 370/203 |
| 2005/0002359 A1 * | 1/2005 | Kim ....................... | 370/334 |
| 2005/0157682 A1 * | 7/2005 | Sandhu .................. | 370/334 |
| 2005/0207333 A1 * | 9/2005 | Rotstein et al. ......... | 370/203 |
| 2006/0258303 A1 * | 11/2006 | Taira et al. .............. | 455/101 |
| 2007/0021130 A1 * | 1/2007 | Taira ...................... | 455/502 |

OTHER PUBLICATIONS

IEEE Std 802®-2001, "802® IEEE Standard for Local and Metropolitan Area Networks: Overview and Architecture," IEEE Computer Society, Mar. 8, 2002.
Manoneet Singh, et al. and Bruce Edwards, et al., "WwiSE proposal: High throughput extension to the 802.11," IEEE 11-04-0886-00-000n, Aug. 13, 2004.
Syed Aon Mujtaba, "TGn Sync Proposal Technical Specification," IEEE 802.11-04/889r0, Aug. 13, 2004.

(Continued)

*Primary Examiner* — Kiet Doan

(57) ABSTRACT

Embodiments of pilot tone processing systems and methods are disclosed. In one embodiment, among others, a pilot tone processing system comprises pilot tone logic configured to receive first pilot tone data corresponding to a first transmit antenna and second pilot tone data corresponding to a second transmit antenna and separate the first pilot tone data from the second pilot tone data.

29 Claims, 9 Drawing Sheets

OTHER PUBLICATIONS

Aon Mujtaba, Adrian P. Stephens, Alek Purkovic, Andrew Myles, Brian Johnson, Daisuke Takeda, Darren McNamara, Dongjun (DJ) Lee, David Bagby, Eldad Perahia, Huanchun Ye, Hui-Ling Lou, James Chen, James Mike Wilson, Jan Boer, Jari Jokela, Jeff Gilbert, Joe Pitarressi, Jorg Habetha, John Sadowsky, Jon Rosdahl, Luke Qian, Mary Cramer, Masahiro Takagi, Monisha Ghosh, Nico van Waes, Osama Aboul-Magd, Paul Feinberg, Pen Li, Peter Loc, Pieter-Paul Giesberts, Richard van Leeuwen, Ronald Rietman, Seigo Nakao, Sheung Li, Stephen Shellhammer, Takushi Kunihior, Teik-Kheong, Tomoko Adachi, Tomoya Yamaura, Tsuguhide Aoki, Won-Joon Choi, Xiaowen Wang, Yasuhiko Tanabe, Yasuhiro Tanaka, Yoshiharu Doi, Yichi Morioka, Youngsoo Kim, "TGn Sync Proposal," IEEE 802.11-04/888r0, Aug. 13, 2004.

VK Jones, Neil Hamady, Jason Trachewsky, Michael Seals, Stephan ten Brink, George Vlantis, Sean Coffey, "WwiSE IEEE 802.11n Proposal," IEEE 802.11-04/0935r3, Sep. 16, 2004.

Supplement to IEEE Standard for Information technology-"Part 11: Wireless LAN Medium Access Control (MAC) and Physical Layer (PHY) specifications: High-speed Physical Layer in the 5 GHZ Band," IEEE std 802.11, 1999 Edition.

IEEE P802.1 I-Task Group N-Meeting Update, http://grouper.ieee.org/groups/802/11/Reports/tgn_update.htm, pp. 1-7.

Jon Rosdahl, "Draft PAR for High Throughput Study Group," Nov. 15, 2002, Revision R1: Jan. 16, 2003, IEEE 802.11-02/798r1, pp. 1-9.

Jon Rosdahl, "Draft PAR for High Throughput Study Group," Nov. 15, 2002, Revision R6: Mar. 13, 2003, IEEE 802.11-02/798r6, pp. 1-8.

Jon Rosdahl, "Criteria For Standards Development," (Five Criteria) Nov. 15, 2002, IEEE 802.11-02/799r0, pp. 1-4.

Jon Rosdahl, "Criteria For Standards Development," (Five Criteria) Nov. 15, 2002, Revision 1: Jan. 16, 2003, IEEE 802.11-02/799r1, pp. 1-4.

Jon Rosdahl, "Criteria For Standards Development," (Five Criteria) Nov. 15, 2002, Revision 1: Jan. 16, 2003, IEEE 802.11-02/799r2, pp. 1-5.

Jon Rosdahl, "Criteria For Standards Development," (Five Criteria) Nov. 15, 2002, Revision 4: Mar. 11, 2003, IEEE 802.11-02/799r3, pp. 1-4.

Jon Rosdahl, "Criteria For Standards Development," (Five Criteria) Nov. 15, 2002, Revision 5: Mar. 13, 2003, IEEE 802.11-02/799r5, pp. 1-4.

* cited by examiner

PILOT TONE PROCESSING SYSTEMS AND METHODS

CROSS-REFERENCE TO RELATED APPLICATION

This application claims priority to U.S. provisional application having Ser. No. 60/592,748, filed Jul. 30, 2004, which is entirely incorporated herein by reference.

BACKGROUND OF THE INVENTION

1. Field of the Invention

The present disclosure is generally related to communication systems, and, more particularly, is related to wireless communication systems and methods.

2. Related Art

Wireless communication systems are widely deployed to provide various types of communication, such as voice, data, and so on. These systems may be based on code division multiple access (CDMA), time division multiple access (TDMA), orthogonal frequency division multiplex (OFDM), or some other multiplexing techniques. OFDM systems may provide high performance for some channel environments. In OFDM systems, the high-speed data signals are divided into tens or hundreds of lower speed signals that are transmitted in parallel over respective frequencies within a radio frequency (RF) signal that are known as subcarrier frequencies ("subcarriers"). The frequency spectra of the subcarriers overlap so that the spacing between them is minimized. The subcarriers are also orthogonal to each other so that they are statistically independent and do not create crosstalk or otherwise interfere with each other. Further, each block of data is mapped into each subcarrier as frequency domain symbols. The symbol duration is much longer than the length of the channel impulse response so that inter-symbol interference is avoided by inserting a cyclic prefix for each OFDM symbol. Thus, OFDM is much less susceptible to data loss caused by multipath fading than other known techniques for data transmission. Also, the coding of data onto the OFDM subcarriers takes advantage of frequency diversity to mitigate loss from frequency-selective fading (e.g., if forward error correction (FEC) is applied).

In a terrestrial communication system (e.g., a cellular system, a broadcast system, a multi-channel multi-point distribution system (MMDS), among others), a RF modulated signal from a transmitter unit may reach a receiver unit via a number of transmission paths. The characteristics of the transmission paths typically vary over time due to a number of factors such as fading and multipath. To provide diversity against deleterious path effects and improve performance, multiple transmit and receive antennas may be used for data transmission. If the transmission paths between the transmit and receive antennas are linearly independent (i.e., a transmission on one path is not formed as a linear combination of the transmissions on other paths), which is generally true to at least an extent, then the likelihood of correctly receiving a data transmission increases as the number of antennas increases. Generally, diversity increases and performance improves as the number of transmit and receive antennas increases.

A multiple-input multiple-output (MIMO) communication system employs multiple transmit antennas and multiple receive antennas for data transmission. A MIMO channel formed by the transmit and receive antennas may be decomposed into independent channels. Each of the independent channels is also referred to as a spatial subchannel of the MIMO channel and corresponds to a dimension.

When using MIMO systems with OFDM multiplexing, the frequency diversity provides an added dimension to a MIMO system that can provide improved performance, but also increases the complexity of a system. For example, signals received at a receiver may be distorted versions of the transmitted signals because of transmitter/receiver imperfections and/or environmental effects that can change the amplitude and phase of the signals, resulting in an increase in the bit error rate at the receiver. In an IEEE 802.11 (herein, "802.11") compliant system (e.g., 802.11a, 802.11g), for example, a receiver may be upconverting a received signal to 2 primary bands (2.4 giga-Hertz (GHZ) or 5.8 GHz), and often there is phase noise (e.g., root mean square (RMS) phase jitter or jitter phase noise) on the voltage controlled oscillators corresponding to upconversion at the transmitter and downconversion at the receiver. In a MIMO-OFDM system, such jitter phase noise is complex.

To remedy these and other signal distortions in single transmit antenna, single receiver antenna (SISO) systems, transmitters may send known signals, such as pilot tone signals, in a preamble portion or data portion (e.g., each transmitter transmits frequency domain coded symbols in which a respective portion of the frequency sub-channels is allocated for the transmission of known pilot symbols values and the remainder is allocated for data values) of a frame being sent to use at the receiver for compensating for distortions in the received signal. For instance, a communication system may transmit a total of 52 subcarriers with each OFDM symbol, with 48 subcarriers carrying data and 4 subcarriers carrying pilot tones. The receiver recovers these pilot tones and uses the same to compute the degree of jitter phase noise on the received signal and then corrects accordingly.

In MIMO-OFDM systems with multiple upconversions and downconversions and cross coupling among multiple transmit and receive antennas, correction of phase jitter and other noise can be complicated, sometimes resulting in destructive interference of signal information at a receiver device.

SUMMARY

Embodiments of pilot tone processing systems and methods are disclosed. In one system embodiment, among others, a pilot tone processing system comprises pilot tone logic configured to receive first pilot tone data corresponding to a first transmit antenna and second pilot tone data corresponding to a second transmit antenna and separate the first pilot tone data from the second pilot tone data.

In one method embodiment, among others, a pilot tone processing method comprises receiving first pilot tone data corresponding to a first transmit antenna and second pilot tone data corresponding to a second transmit antenna, and separating the first pilot tone data from the second pilot tone data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure.

BRIEF DESCRIPTION OF THE DRAWINGS

Many aspects of the disclosed systems and methods can be better understood with reference to the following drawings.

The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of pilot tone processing systems and methods, herein simply pilot tone processing systems. Such pilot tone processing systems separate multiple receive signals (and pilot tones from those receive signals) transmitted from multiple antennas, and uses the recovered pilot tones corresponding to each transmit signal to correct for phase noise among other distortions in the received signals. In particular, the disclosed pilot tone processing systems can recover multiple transmit signals by separating self-interfering data subcarriers and/or self-interfering pilot subcarriers. In addition, the disclosed pilot tone processing systems can provide phase-locked loop (PLL) processing of the recovered pilot subcarriers or pilot data in a multiple input, multiple output (MIMO) environment.

Although described in the context of a multiple input, multiple output (MIMO) communication environment that implements orthogonal frequency domain multiplexing (OFDM), such as found in the proposed IEEE 802.11n standard, the scope of the preferred embodiments can be applied to, and thus include, other multiplexing techniques and/or standards.

Figure 1:
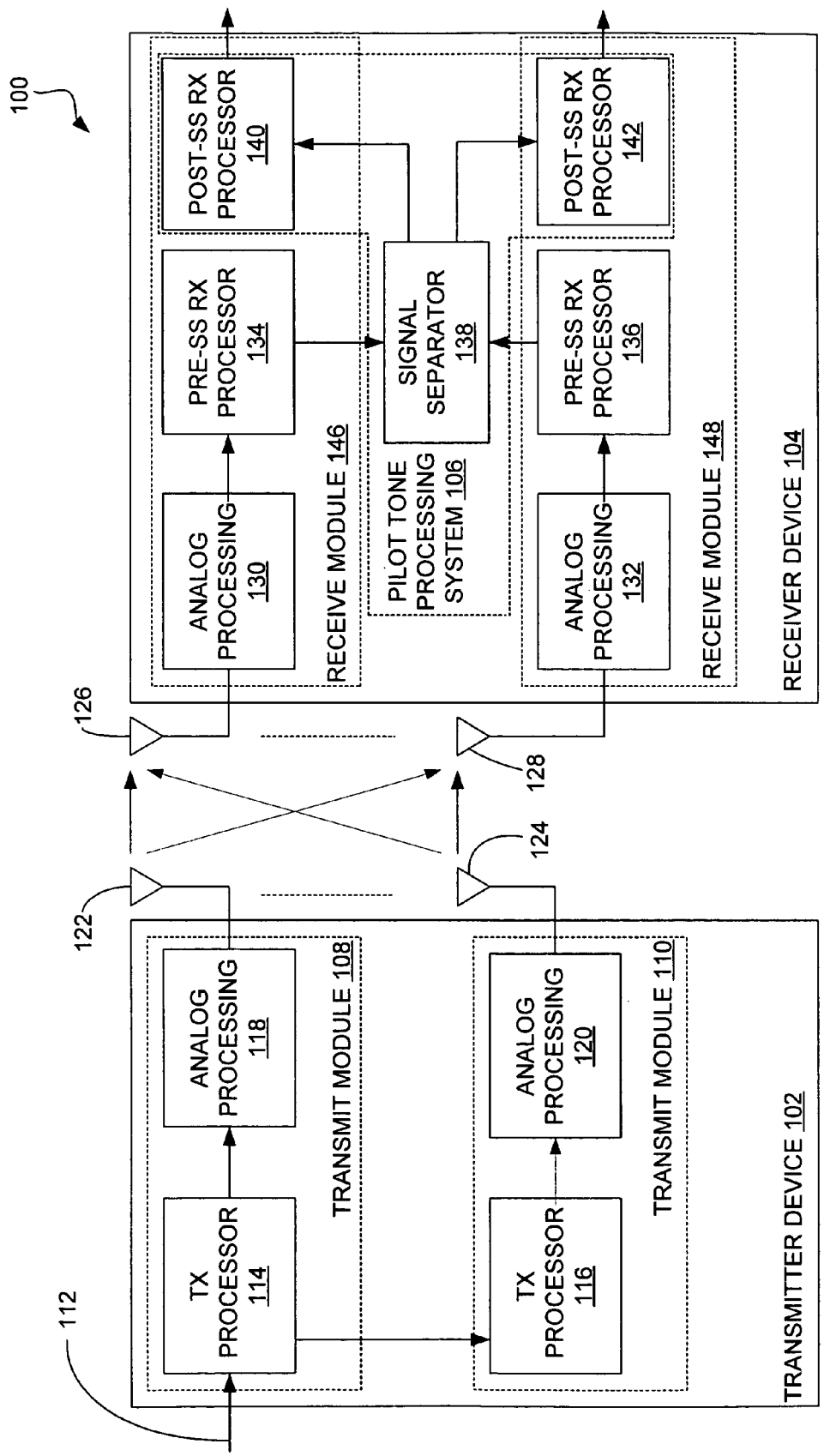
FIG. 1 is a block diagram of an exemplary communication system comprising a transmitter device and a receiver device in which embodiments of a pilot tone processing system can be implemented.

FIG. 1 is a block diagram of an exemplary communication system 100 comprising a transmitter device 102 and a receiver device 104 in which embodiments of a pilot tone processing system 106 can be implemented. The transmitter device 102 is in communication (e.g., radio frequency) with the receiver device 104. The transmitter device 102 and the receiver device 104 each may be embodied in any wireless communication device, including computers (desktop, portable, laptop, etc.), consumer electronic devices (e.g., multimedia players), compatible telecommunication devices, personal digital assistants (PDAs), or any other type of network devices, such as printers, fax machines, scanners, hubs, switches, routers, set-top boxes, televisions with communication capability, etc. The transmitter device 102 comprises transmit modules 108 and 110. The transmit module 108 comprises a transmit (TX) processor 114 and analog processing circuitry 118, the analog processing circuitry 118 coupled to an antenna 122. The transmit module 110 comprises like circuitry to transmit module 108, including a transmit (TX) processor 116, analog processing circuitry 120, and an antenna 124.

The transmit processor 114 receives information (e.g., data) over connection 112. The transmit processor 114 encodes the data, interleaves (e.g., reorders, distributes) the encoded data, and maps the resulting interleaved bits into respective subcarrier channels. The phase and amplitude of the subcarriers are modulated, converted to the time domain (e.g., resulting in the formation of OFDM symbols), and pilot tones (or equivalently, pilot subcarriers or pilot tone data) and cyclic extensions (e.g., guard intervals) are inserted. The OFDM symbols are passed to the analog processing circuitry 118 to undergo processing such as upconversion and amplification, and then passed to the antenna 122 for transmission to receiver device 104. Note that the mapped bits from transmit processor 114 are also provided to one or more additional transmit processors, such as transmit processor 116, which provides the same functionality as transmit processor 114 for processing data ultimately slated for transmission from antenna 124.

At the receiver device 104, two or more receive antennas, such as receive antennas 126 and 128, receive the transmitted signals from antennas 122 and 124. Note that multiple paths of transmission may occur among antennas 122, 124, 126, and 128. The received signals are provided to receive modules 146 and 148. Receive module 146 comprises analog processing circuitry 130, which filters and demodulates the received signals and generally performs processing that is complementary to the processing performed at analog processing circuitry 118 and 120. The demodulated signals are provided to pre-signal separator (SS) receive (RX) processors 134 and 136, which provide functionality for UQ signal determination, clock recovery, cyclic extension removal, and transformation (e.g., fast Fourier transform, or FFT). Processed data from pre-signal separator receive processors 134 and 136 are provided to the pilot tone processing system 106, which comprises a signal separator 138 that recovers channel information and separates the received, self-interfering signals (self-interfering data subcarriers and pilot subcarriers) corresponding to transmit signals sent from antennas 122 and 124 to recover the pilot subcarriers inserted at the respective transmit modules 108 and 110 of the transmitter device 102. The data subcarriers and pilot subcarriers are then passed to the post-signal separator (SS) receive processors 140 and 142, where the data subcarriers are separated from the pilot subcarriers. The pilot subcarriers are maximum ratio combined (or simply combined), phase-locked looped, and then used for correction of jitter phase noise and/or other corruptions to the transmitted/received signals. The data subcarriers are provided to error correction circuitry located downstream of the post-signal separator receive processors 140 and 142.

Note that the transmitter device 102 and receiver device 104 may each comprise functionality of both devices 102 and 104. Further, although shown with two antennas per device 102 and 104, additional antennas may be utilized, and single-input, single-output (SISO) devices may also be included in the communication system 100. Also, in some embodiments, the pilot tone processing system 106 may comprise additional, fewer, or different components.

Figure 2:
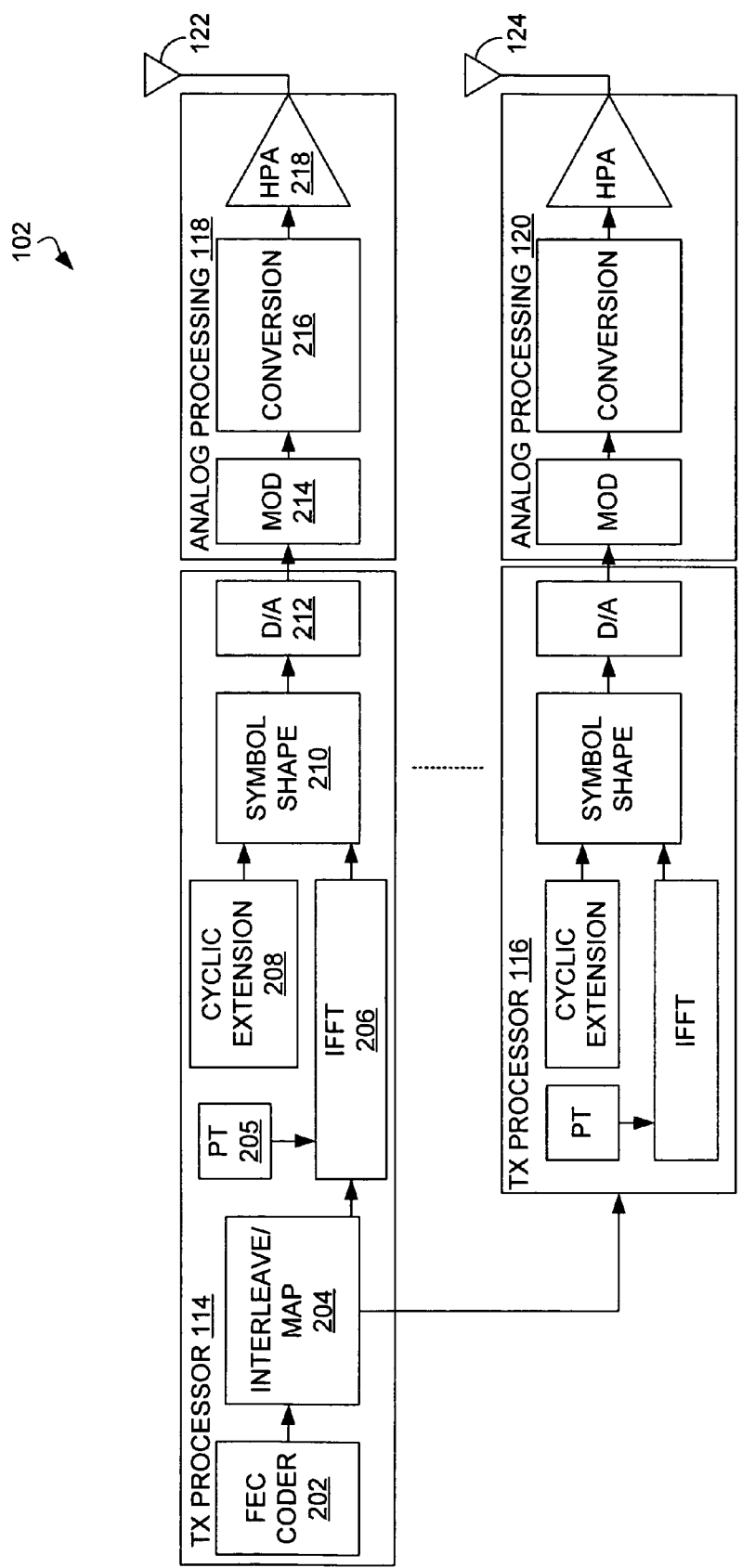
FIG. 2 is a block diagram of an exemplary transmitter device as shown in FIG. 1

FIG. 2 is a block diagram of the transmitter device 102 shown in FIG. 1. The transmitter device 102 comprises transmit processors 114 and 116, analog processing circuitry 118 and 120, and multiple antennas (two are illustratively shown, 122 and 124). The transmit processors 114 and 116 are similar, and thus discussion will be limited to transmit processor 114 for brevity. Likewise, analog processing circuitry 118 and 120 are similar, and thus discussion is limited to analog processing circuitry 118 for brevity. Transmit processor 114 comprises a forward error correction (FEC) encoder 202, an interleaver/mapper 204, pilot tone (PT) insertion module 205, inverse fast Fourier transform (IFFT) circuitry 206, cyclic extension insertion logic 208, symbol shape logic 210, and a digital-to-analog (D/A) converter 212. The analog processing circuitry 118 comprises a modulator 214 (e.g., in-phase/ quadrature (I/Q) modulator and oscillator), conversion logic 216 (e.g., oscillator and mixer), and high power amplifier (HPA) 218. It would be appreciated by one having ordinary skill in the art that fewer, additional, and/or different components can be included in the transmitter device 102.

The FEC encoder (or FEC coder) 202 receives information from a data source and encodes the received information according to one or more encoding schemes. The FEC encoder 202 provides the encoded information to interleaver/ mapper 204, which interleaves or distributes the encoded information and maps (e.g., over approximately 64-subcarriers) the same for use over multiple antennas. Thus, the mapped data is also provided to transmit processor 116 for processing as described for transmit processor 114.

The interleaver/mapper 204 provides the encoded and mapped data to the IFFT circuitry 206 (e.g., 64-point IFFT). The pilot tone insertion module 205 also provides pilot tones to the IFFT circuitry 206 for insertion at one or more frequency positions to be placed in an OFDM symbol. The IFFT 206 converts the 64 subcarriers to its corresponding time-domain representation (an OFDM symbol), and removes various subcarriers. In one embodiment, each OFDM symbol is configured with 52 subcarriers (e.g., 48 comprising data and 4 comprising pilot tones). Each OFDM symbol is further processed by cyclic extension logic 208 and symbol shape logic 210. The cyclic extension logic 208 inserts a cyclic prefix (e.g., guard interval) into an OFDM symbol processed at symbol shape logic 210 to ensure that the transmitted symbol retains its orthogonal properties in the presence of multipath delay spread. The symbol shape logic 210 provides interpolator functionality as well as low-pass filter smoothing of edges between successive OFDM symbols, in one embodiment creating tapered trailer and leading edges of each OFDM symbol. The resulting transmission symbols are converted to analog form at the D/A converter 212, and then provided to the analog processing circuitry 118.

Within the analog processing circuitry 118, the analog transmission signals are modulated, upconverted, and amplified/filtered at modulator 214, conversion logic 216, and HPA 218, respectively. The resulting signal is then transmitted over antenna 122 (and in similar manner, signals are transmitted from antenna 124 for corresponding transmit processor 116 and analog processing circuitry 120).

Figure 3A:
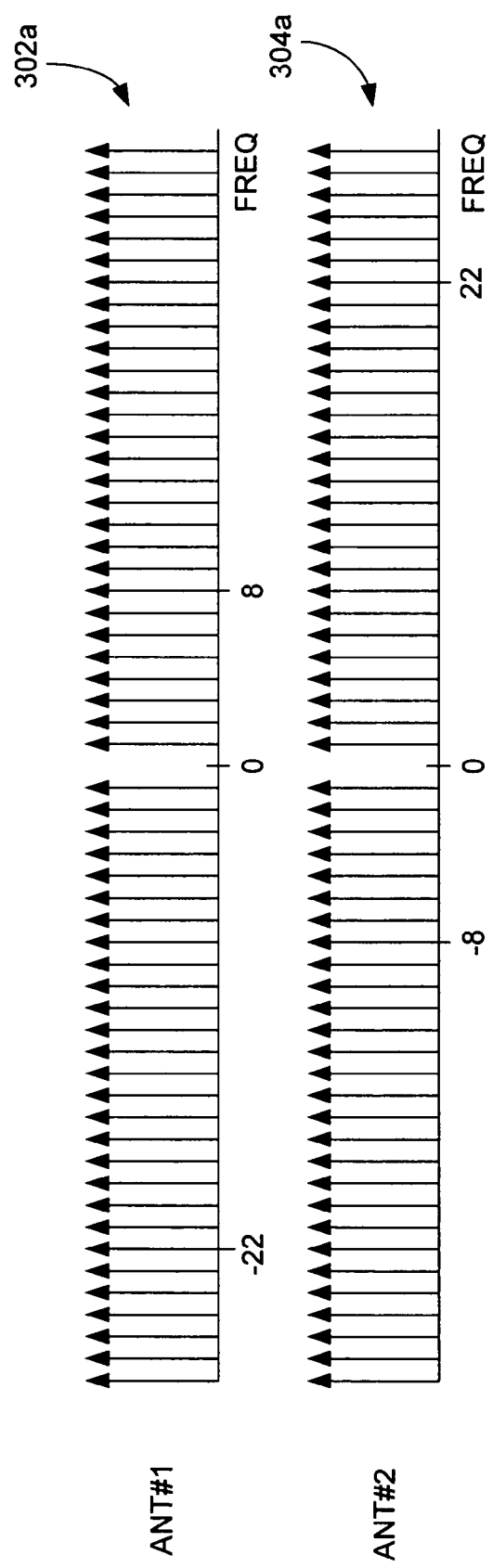
FIGS. 3A-3B are schematic diagrams of an exemplary pilot tone patterns that can be generated by a transmitter device such as that shown in FIG. 2.
Figure 3B:
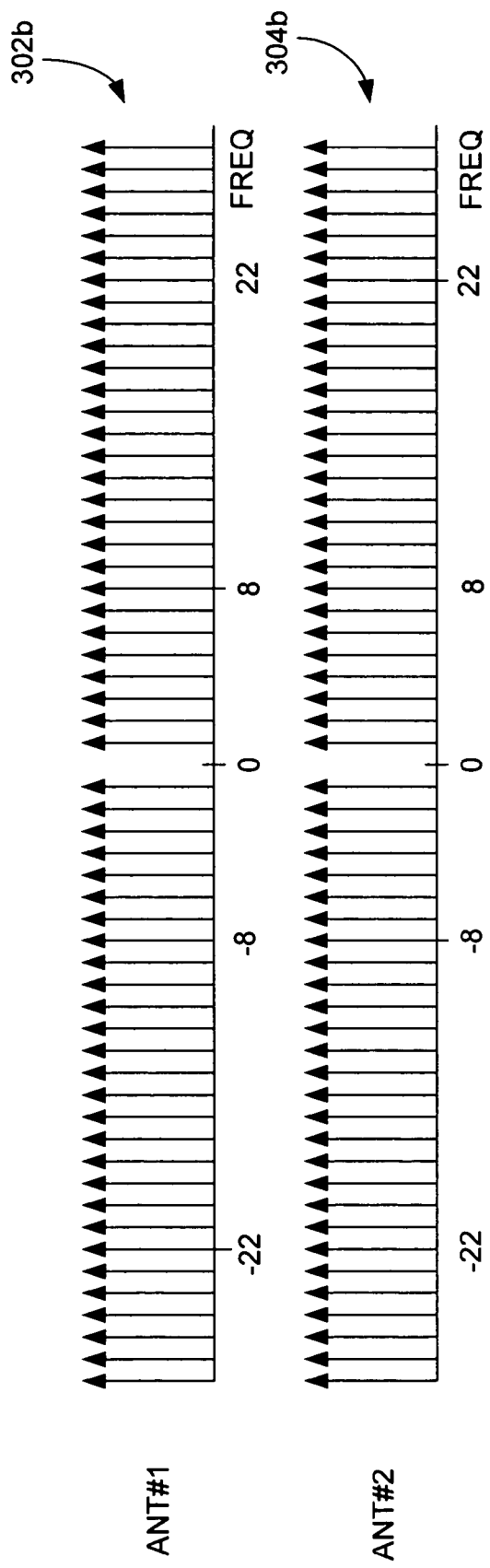

FIG. 3A is a schematic diagram of an exemplary pilot tone pattern that can be generated by a transmitter device such as transmitter device 102 shown in FIG. 2. In particular, two OFDM symbols 302a and 304a are shown, each having a plurality of subcarriers with a pattern of pilot tones inserted. In this example, pilot tones are provided in the OFDM symbol 302a corresponding to transmit antenna #1 (e.g., antenna 122, FIG. 2) at subcarrier positions −22 and +8 [−22,8]. For the OFDM symbol 304a corresponding to transmit antenna #2 (e.g., antenna 124), pilot tones are inserted at symmetrical positions (with respect to positions corresponding to the OFDM symbol 302a) [−8, 22]. Other pilot insertion mechanisms or patters can be implemented. For instance, FIG. 3B shows two OFDM symbols 302b and 304b with pilot subcarriers at the same positions on both antennas #1 and #2 [−22, −8, 8, 22]. In such instances, the pilot subcarriers may have pseudo-random phase jumps from one OFDM symbol to the next, mimicking data subcarriers. Such pseudo-random jumps may be different on different antennas. The receiver device strips off the pseudo random pilot tone modulation since it has a known (e.g., deterministic) pattern. In some implementations, pilot tone insertion mechanisms may provide for randomization of the pilot tone placement, such as over two consecutive symbols that are subtracted and added at a receiver device to recover the pilot tones (one of the mathematical processes resulting in dropping one of the pilot tones and recovering the other). This and other mechanisms attempt to eliminate or reduce the probability of pilot tone cancellation at a receiver device, which can be a problem in conventional systems.

Figure 4A:
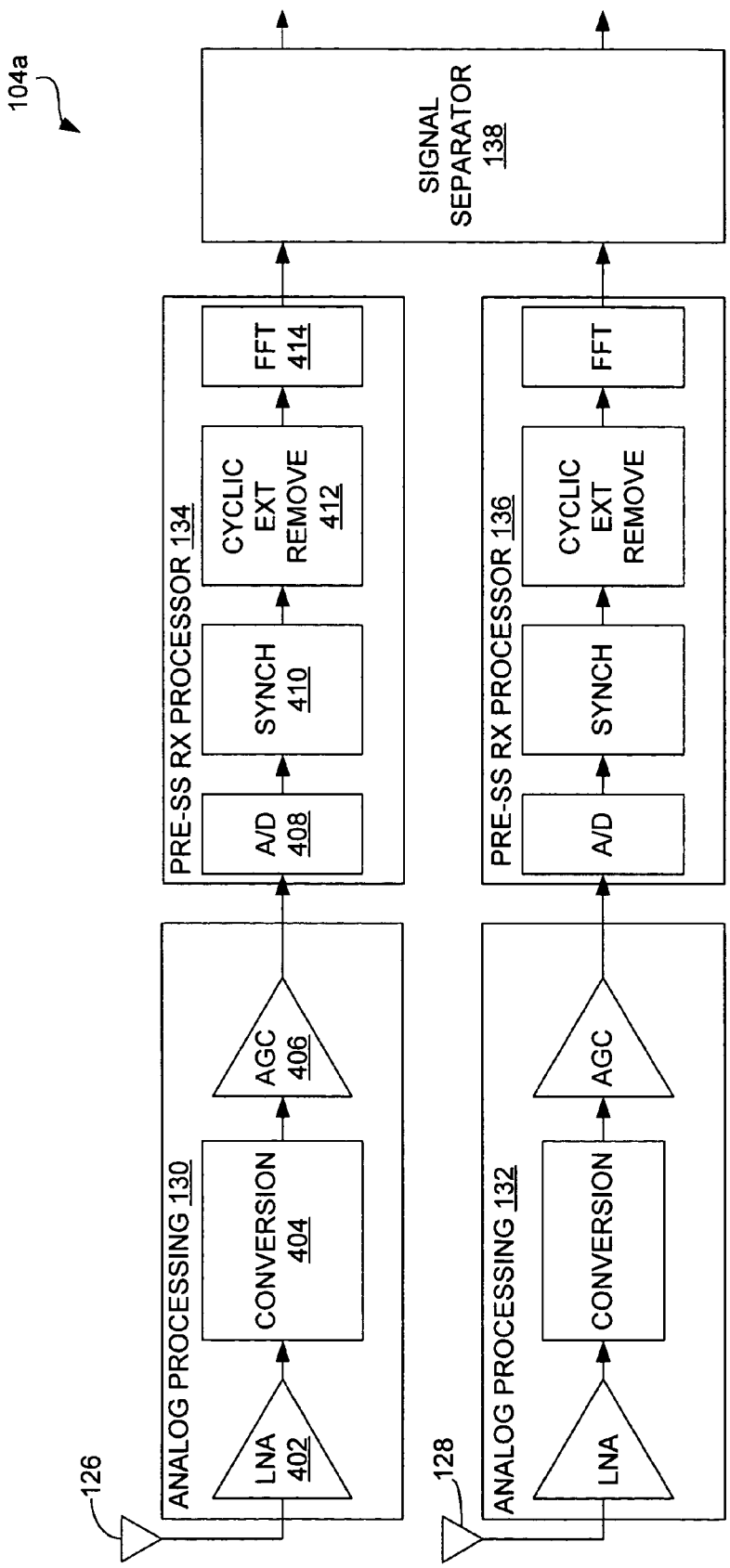
FIG. 4A is a block diagram of an embodiment of a portion of the receiver device shown in FIG. 1.

FIG. 4A is a block diagram of an embodiment of a portion 104a of the receiver device 104 shown in FIG. 1. The receiver device portion 104a comprises analog processing circuitry 130 and 132, pre-signal separator (SS) receive processors 134 and 136, and signal separator 138. Analog processing circuitry 130 and 132 are similar, as are pre-signal separator receive processors 134 and 136, and thus the discussion of analog processing circuitry 132 and pre-signal separator receive processor 136 are omitted for brevity. Analog processing circuitry 130 comprises a low noise amplifier (LNA) 402, conversion logic 404 (e.g., mixer and oscillator), and automatic gain control (AGC) logic 406. Pre-signal separator receive processor 134 comprises analog-to-digital (A/D) converter 408, synchronization logic 410, cyclic extension removal logic 412, and fast Fourier transform (FFT) logic 414. Additional processing blocks may be included in some embodiments, such as a matched filter combiner(s), memory, state logic, among other components.

The signals transmitted from transmit antennas 122 (and 124), as shown in FIG. 1, are received both at receive antennas 126 (and 128), and provided to the low noise amplifier (LNA) 402. The LNA 402 filters the signal and provides the filtered signal to conversion logic 404, where the filtered signal is downconverted to baseband (e.g., in-phase (I) and quadrature (Q) signals), or intermediate frequency (IF) in some embodiments. The downconverted signal is provided to AGC 406, where the signal is amplified. In some embodiments, the AGC 406 may provide the receiver power level back to the transmitter device 102 (FIG. 2), such as to assist the transmitter device 102 in determining effective transmission methods. The amplified I and Q signals are converted to the digital domain at A/D converter 408 of the pre-signal separator receive processor 134. The A/D converter 408 provides the digital data to the synchronization logic 410. The synchronization logic 410 recovers the clock signal and corrects for differences between the oscillation frequency of the local oscillator of the transmitter device 102 and the oscillation frequency of the local oscillator of the receiver device 104 (FIG. 1). The digital data is further provided to the cyclic extension removal logic 412, which removes un-needed cyclic extensions, and then to FFT logic 414. The FFT logic 414 demodulates the digital data stream to recover the original sequences of frequency domain subcarriers.

The frequency domain subcarriers (both data and pilot) are provided to the signal separator 138, which evaluates the amplitude and phase rotations in the multipath signals, provides channel estimates for each subcarrier, inversion (e.g., single coefficient inversion, such as minimum mean squared error (MMSE) techniques, zero forcing (ZF), etc.), and frequency equalizes the recovered signal. The signal separator 138 exploits multipath (e.g., using information such as the angle of reception of received signals at each receive antenna 126 and 128) to discern the two signals sent from respective transmit antennas 122 and 124 (FIG. 1) on a subcarrier-by-subcarrier basis. The output of the signal separator 138 comprises a reproduction of the transmit signal sent from transmit antenna 122, the transmit signal sent from transmit antenna 124, and the pilot tones from each respective transmit signal, regardless of the pilot tone insertion mechanisms or patterns used at the transmitter device 102 (FIG. 1).

Figure 4B:
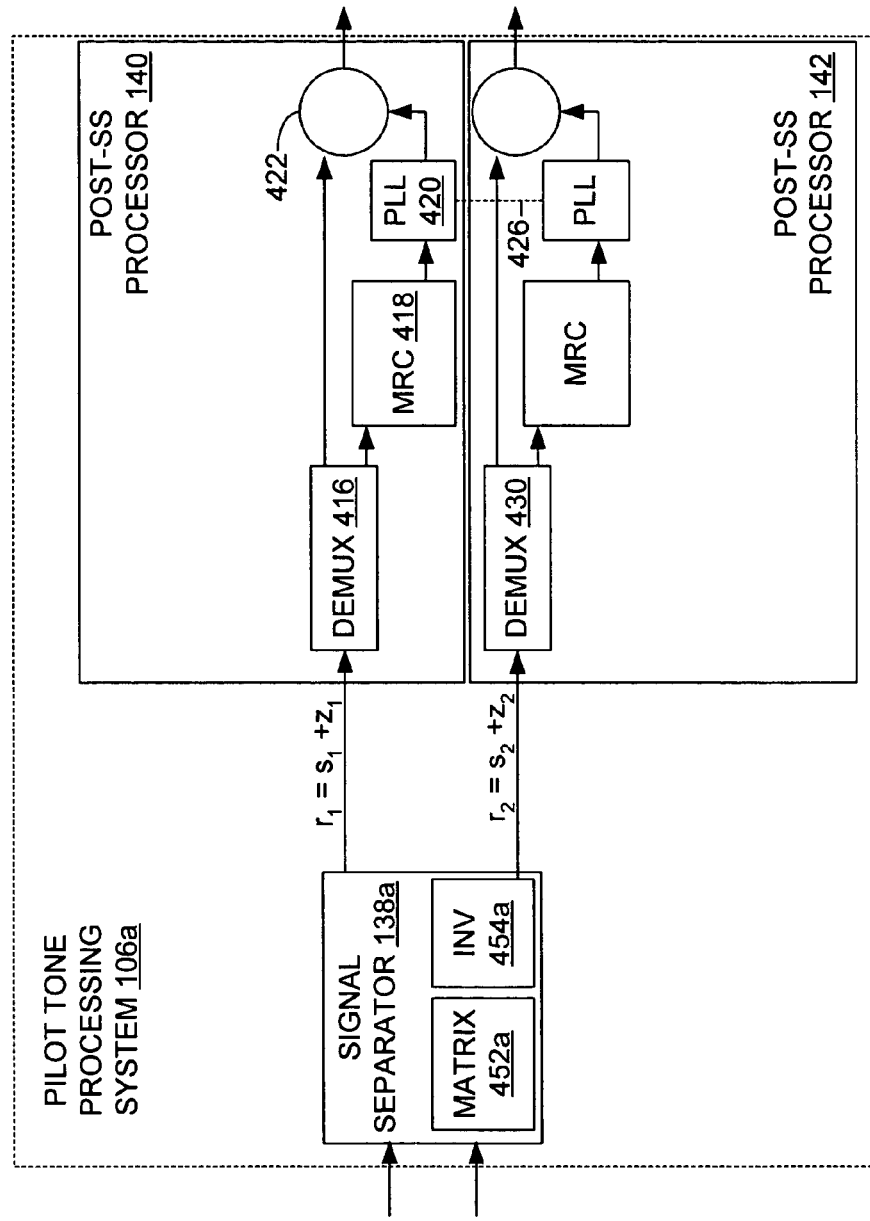
FIGS. 4B-4D are block diagrams of various embodiments of the pilot tone processing system shown for the receiver device shown in FIG. 1.
Figure 4C:
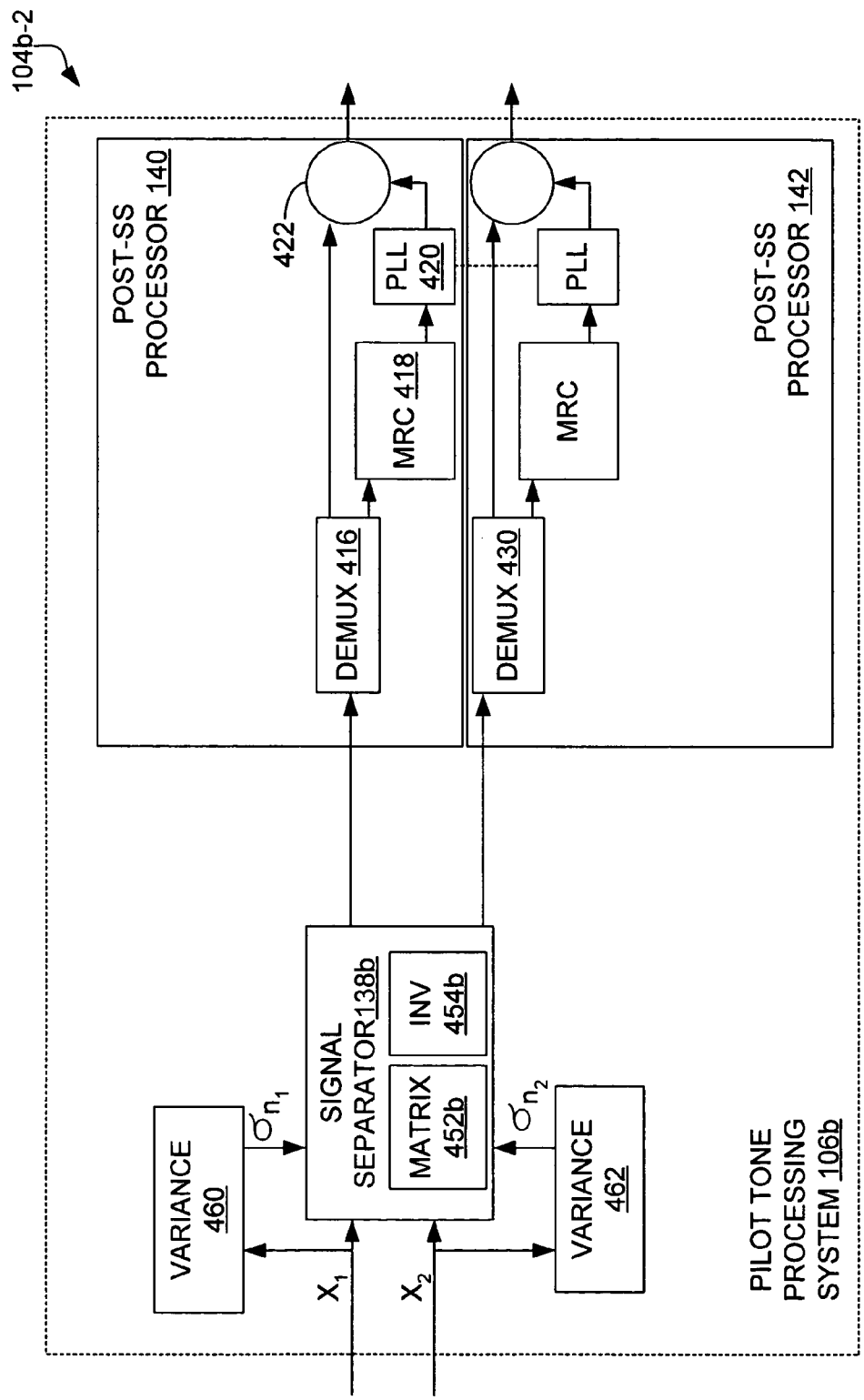
Figure 4D:
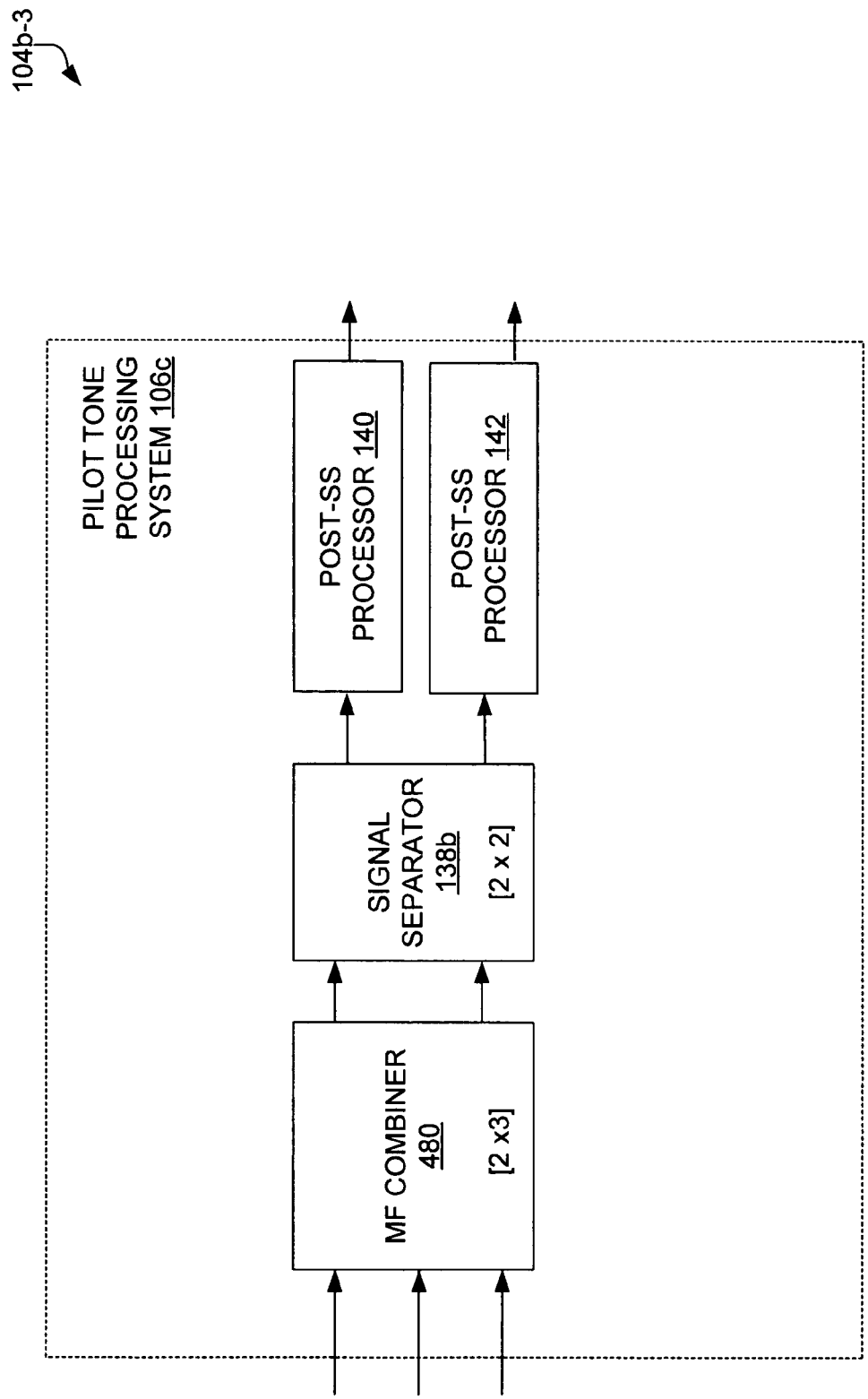

FIGS. 4B-4D are block diagrams that illustrate various embodiments of receiver device portion 104b (e.g., 104b-1, 104b-2, and 104b-3) of the receiver device 104 (FIG. 1). Note that the signal separator 138 is shown and discussed for both portions 104a, 104b. In particular, FIG. 4B illustrates one embodiment of a pilot tone processing system 106a that comprises a signal separator 138a having zero-forcing (ZF) functionality. FIG. 4C illustrates another embodiment of a pilot tone processing system 106b that comprises a signal separator 138b having minimum mean squared error (MMSE) functionality. FIG. 4D illustrates another embodiment of a pilot tone processing system 106c that comprises the MMSE signal separator 138b of FIG. 4C with the addition of a matched filter combiner. One or more components of the pilot tone processing systems 106a, 106b, 106c can be implemented using digital circuitry, analog circuitry, or a combination of both. Also, one or more components of the pilot tone processing system 106 (e.g., 106a, 106b, 106c) can be implemented in hardware, software, firmware, or a combination thereof. If implemented in hardware, the one or more components of the pilot tone processing system 106 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

If implemented partly or wholly in software, the one or more components of the pilot tone processing system 106 can be comprised of software or firmware that is stored in a memory and that is executed by a suitable instruction execution system.

Further, it will be understood that some embodiments may comprise signal separators having both MMSE (with or without the matched filter combiner) and ZF functionality, among other functionality.

In general, the signal separator 138 (e.g., 138a, 138b) separates the distorted (e.g., distortion in amplitude, phase, delay, echoes, etc.) self-interfering multipath signals received at the receiver device 104 (FIG. 1). In one embodiment, the signal separator 138 achieves this separation functionality by estimating the multipath channel (e.g., computing a 2×2 matrix for each subcarrier) using the received packet preambles, inverting the multipath channel (e.g., computing a 2×2 inverse matrix for each subcarrier), and then passing the received subcarriers, symbol-by-symbol, through the inverse channel (matrix inverse) to retrieve or recover reproductions of the (undistorted) transmit signals corresponding to each transmit antenna 122 and 124 (FIG. 1). Thus, the pilot tones (and data subcarriers) corresponding to each transmit antenna 122 and 124 are separated from each other. In the post-signal separator receive processors 140 and 142, the pilot tones are separated from the data subcarriers. Deviations in the pilot tones are used to track the received signal. That is, the post-signal separator receive processors 140 and 142 detect these deviations in the pilot tones and use the deviations to phase lock the signal, removing frequency offsets and phase jitter.

Referring to FIG. 4B, receiver portion 104b-1 comprises a pilot tone processing system embodiment 106a. The pilot tone processing system 106a comprises an embodiment of a zero-forcing signal separator 138a and post-signal separator receive processors 140 and 142. In some embodiments, the pilot tone processing system 106a may comprise fewer, more, or different components. In zero-forcing, pre-signal separator 138a noise is generally ignored, and the multipath (e.g., echoes) is used in matrix computations by the signal separator 138a. The signal separator 138a comprises matrix logic 452a and inversion logic 454a, which provide for frequency equalization and signal separator functionality. Post signal separator processors 140 and 142 are similar, and thus most of the discussion of post-signal separator processor 142 is omitted for brevity. Post-signal separator receive processor 140 comprises, in one embodiment, a demultiplexer (demux) 416, maximum ratio combining (MRC) logic 418, a phase-locked loop (PLL) 420, and a combiner 422. Note that in some embodiments, simple combining (merely summing the recovered pilots) can be used in lieu of maximum ratio combining.

In operation, each receive module 146 and 148 corresponding to antennas 126 and 128 (FIG. 1) estimates two channels, one from each of the two transmit antennas (e.g., 122 and 124, FIG. 1). For instance, in a two-antenna receiver device, four channels are estimated. The channel estimates are computed using, for example, a preamble portion of the transmitted OFDM packets, and a zero-forcing solution is computed using the channel estimates. Thus, for every OFDM symbol comprising subcarriers received on each antenna (e.g., antenna 126 and 128), the matrix logic 452a computes a channel matrix, H. For example, the matrix logic 452a assigns elements $H_{11}$, $H_{12}$, $H_{21}$, $H_{22}$ to a 2×2 channel matrix, where each element represents the amplitude and phase of the signal arriving in the multipath environment. The matrix logic 452a provides the computed channel matrix to the inversion logic 454a. The inversion logic 454a computes the matrix inverse of the channel, H (e.g., $H^*F_{ZF}=H^*H^{-1}=1$). The inversion eliminates cross-interference provided by the transmit antennas 122 and 124. Once inverted, the transmit signals (or rather the reproductions of the respective transmit signals (and thus the pilot tones)) are separated (i.e., self-interference is eliminated or substantially eliminated). The combined operation of the matrix logic 452a and inversion logic 454a can be referred to as a zero-forcing computation method or process. Through such a zero forcing computation process, the signal separator 138a performs exact or substantially exact signal separation and exact or substantially exact equalization of the desired signal.

Beyond the signal separator 138a (or in some embodiments, included as functionality in the signal separator 138a), further processing can be implemented. For instance, the output signals of the signal separator 138a may be provided to demultiplexers 416 and 430. The output of the signal separator 138a comprises separated signals represented by $r_1$ ($r_1=s_1+z_1$, where $s_1$ comprises the transmitted signal from one antenna and $z_1$ is the noise output from the signal separator 138a) and $r_2$ ($r_2=s_2+z_2$, where $s_2$ comprises the transmitted signal from a different antenna and $z_2$ is the noise output from the signal separator 138a). The signals $r_1$ and $r_2$ are provided to the demultiplexers 416 and 430, respectively, where the data subcarriers are separated from the pilot tones. The pilot tones may undergo signal-to-noise ratio (SNR) estimating and weighting functionality.

Referring to post-signal separator receive processor 140, the demultiplexer 416 extracts the data subcarriers and the pilot tones and provides each along separate paths. The pilot tones per OFDM symbol are provided to MRC logic 418, where the signal-to-noise ratio (SNR) is evaluated, and the pilot tones are weighted as a function of their respective SNR and combined into a single pilot tone that comprises a weighted summation of the pilot tones. In some embodiments, simple combining may be implemented. The single, weighted pilot tone (per OFDM symbol) is provided to the PLL 420. The PLL 420 phase-lock loops the weighted pilot tone, and provides the phase-locked loop signal to one input of the combiner 422, and the data carriers are provided from the demultiplexer 416 to another input of the combiner 422. The output of the combiner 422 represents subcarrier data corrected through the use of the phase-locked loop signal for distortions such as jitter phase noise and other distortions. The corrected subcarrier data is provided to forward error correcting (FEC) circuitry (not shown) in known manner. The same or similar processing occurs in post-signal separator receive processor 142.

In some embodiments, information can be shared between PLLs of the post-signal processors 140 and 142, as represented by dotted, double-arrowed line 426. An exemplary implementation where such sharing further reduces noise is when a transmitter device and receiver device share a common reference (and thus phase noise jitter is highly correlated). The sharing can be proportional to the amount of correlation.

FIG. 4C shows a portion of receiver device 104b-2, and in particular, an embodiment of a pilot tone processing system 106b is illustrated. The pilot tone processing system 106b comprises an embodiment of a signal separator 138b (having matrix logic 452b and inversion logic 454b), variance estimator modules 460 and 462, and post-signal separator processors 140 and 142. As processing for post-signal separator processors 140 and 142 is the same or similar to the description above, the discussion of the same is omitted for brevity. The signal separator 138b performs minimum mean squared error (MMSE) processing, which may be implemented when the computed matrix (computed by matrix logic 452b) is singular or near singular. In general, in MMSE processing, the signal separator 138b uses estimated noise levels during matrix computations. Note that in some embodiments, the signal separators 138a (FIG. 4B) and 138b can perform both ZF and MMSE computations, among other techniques or methods. If a matrix is singular or near singular, inversion without implementing MMSE techniques may cause the noise levels to be stronger than the desired signal levels (e.g., 50 decibels or dB higher). By implementing MMSE techniques, the inversion logic 454b backs off or otherwise employs reduced inversion until an acceptable signal-to-noise ratio (SNR) is reached for the desired signal. The amount of reduced inversion may be a matter of design choice, balancing the reduced noise levels at the expense of increased corruption from multipath signals in addition to the desired transmit signal.

Similar to the description provided for zero-forcing functionality, the matrix logic 452b computes a channel-noise matrix. In contrast to zero-forcing functionality (which generally ignores, pre-signal separator stage, the effects of noise), noise variances $\sigma_{n1}^2$ and $\sigma_{n2}^2$ are computed via variance estimate modules 460 and 462, and fed forward to the signal separator 138b. The inversion logic 454b computes the inverse of the channel-and-noise correlation matrix. When the noise variance is very small (e.g., $\sigma_{n1}^2$ approaches zero), the MMSE solution tends toward a ZF solution with exact or substantially exact signal separation. Thus, MMSE computation attempts to minimize error between the detected value and the true value of the signals, and has similar performance for equal and unequal noise variances.

In some embodiments, N (e.g., 2) transmit antennas may be used with N+1 (e.g., 3) receive antennas. FIG. 4D shows a portion of receiver device 104b-3, and in particular, shows an embodiment of a pilot tone processing system 106c for a communication system that comprises a 2×3 MIMO configuration (e.g., 2-transmitter devices, 3 receiver devices). The pilot tone processing system 106c utilizes the MMSE embodiment shown in FIG. 4C, with the addition of a matched filter combiner 480 for a 2×3 MIMO system environments. In general, the matched filter combiner 480 converts the 3 receive antennas into a 2-output equivalent. The signal separator 138b then inverts the 2-output equivalent. In particular, the matched filter combiner 480 provides a 2×3 matrix to the signal separator 138b from a 3×2 channel matrix, H. The signal separator 138b receives the 2×3 matrix and computes a 2×2 inversion as described in association with FIG. 4C. In other words, the MMSE solution is computed by transposing the 3×2 channel matrix (H) and taking the conjugate of the transposed matrix $(H^T)^*$, resulting in a 2×3 matrix at the matched filter combiner 480. Then, multiplying the transmit signal, x (e.g., $x_1$, $x_2$, etc. in FIG. 4C), received at the signal separator 138b, results in the following equation:

$$y = (H^T)^* H x, \qquad \text{Eq. 1}$$

where y is now a 2×2 matrix (a composite matrix). Then, the $(H^T)^*H$ term is inverted by inversion logic 454b (FIG. 4C), and the result is provided to the post-signal separator processors 140 and 142 as described above. Note that various configurations in addition to those shown may similarly apply (e.g., 3×3, 3×4, etc.).

As described above, the signal separator 138 (e.g., 138a, 138b, and 138c) provides separation functionality for both the data subcarriers and the pilot subcarriers. Such separation functionality can be implemented by re-using existing data subcarrier circuitry/software, or adding similar circuitry/software to the signal separator 138 to process the pilot subcarriers in parallel with the data subcarriers.

Figure 5:
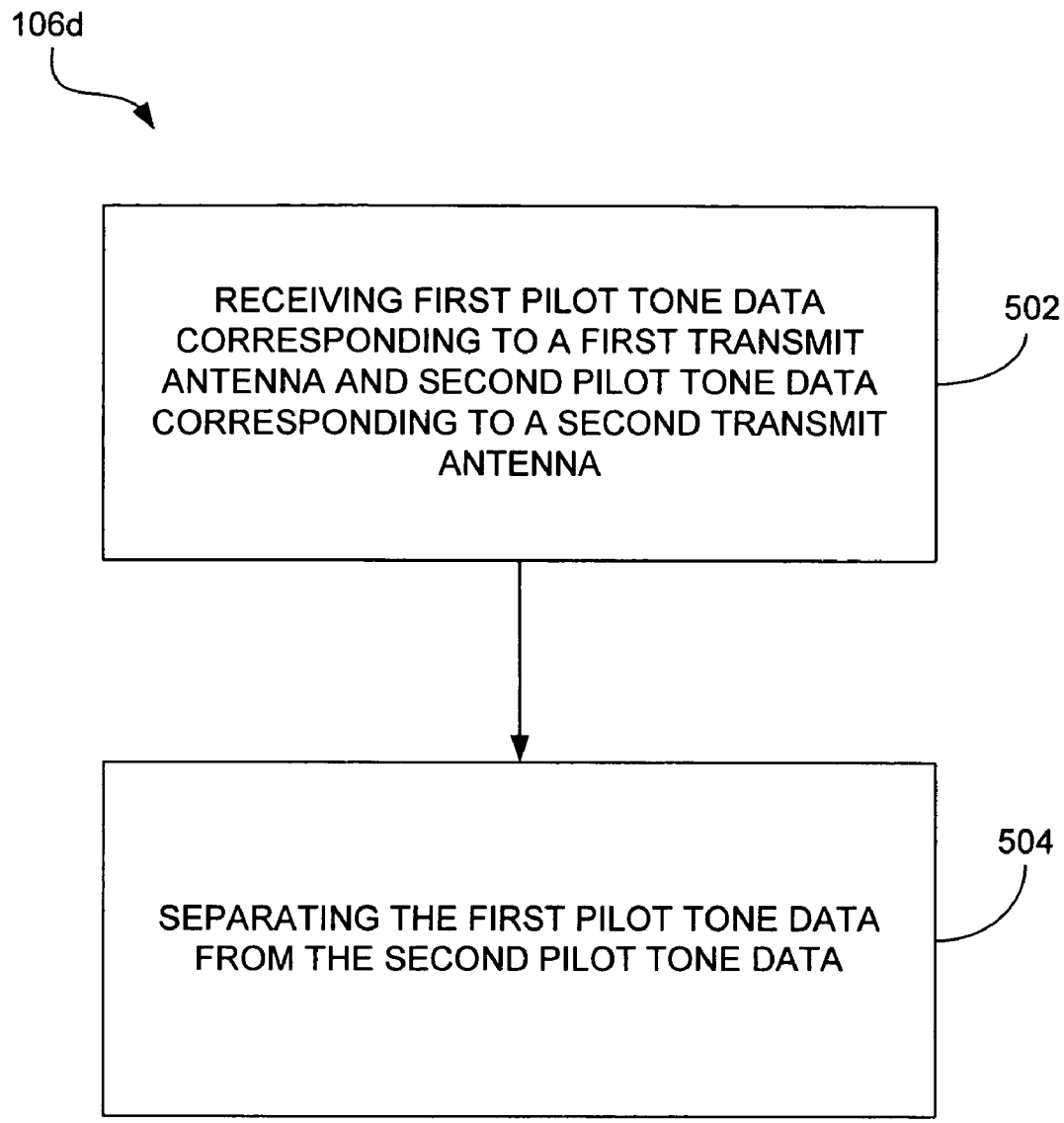
FIG. 5 is a flow diagram of an embodiment of a pilot tone processing method.

As will be appreciated from the above description, one embodiment of a pilot tone processing method 106d is illustrated in FIG. 5. Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

As shown in FIG. 5, the pilot tone processing method 106d comprises receiving first pilot tone data corresponding to a first transmit antenna and second pilot tone data corresponding to a second transmit antenna (502), and separating the first pilot tone data from the second pilot tone data (504).

It should be emphasized that the above-described embodiments, particularly, any "preferred" embodiments, are merely possible examples of implementations, merely set forth for a clear understanding of the principles of the disclosure. Many variations and modifications may be made to the above-described embodiment(s) without departing substantially from the scope of the disclosure. All such modifications and variations are intended to be included herein within the scope of this disclosure.

What is claimed is:
1. A method comprising:
 receiving, at a receiving device, a first signal transmitted, from a first antenna, on a first communications path and a second signal transmitted, from a second antenna, on a second communications path, wherein the first signal includes a first set of data subcarriers and a first set of pilot subcarriers, and wherein the second signal includes a second set of data subcarriers and a second set of pilot subcarriers;

separating the first set of data subcarriers from the second set of data subcarriers and separating the first set of pilot subcarriers from the second set of pilot subcarriers according to a signal separating function, wherein the signal separating function is based on a first channel estimate for the first communications path and a second channel estimate for the second communications path; and match-filter combining at least one pilot subcarrier of the first set of pilot subcarriers with at least one pilot subcarrier of the second set of pilot subcarriers.

2. The method of claim 1, wherein the channel estimate for the first communications path is based on a first preamble of the first signal, and wherein the channel estimate for the second communications path is based on a second preamble of the second signal.

3. The method of claim 1, further comprising separating the first set of data subcarriers from the first set of pilot subcarriers, and separating the second set of data subcarriers from the second set of pilot subcarriers.

4. The method of claim 1, wherein the signal separating function comprises a zero forcing function.

5. The method of claim 1, wherein the signal separating function comprises a minimum mean squared error function.

6. The method of claim 1, further comprising correcting phase and jitter distortions in the first and second sets of data subcarriers based on the first and second sets of pilot subcarriers.

7. The method of claim 1, further comprising combining each individual pilot subcarrier from the first set of pilot subcarriers with a corresponding individual pilot subcarrier from the second set of pilot subcarriers to create a set of combined pilot subcarriers, and phase-lock looping each combined pilot subcarrier of the set of combined pilot subcarriers.

8. The method of claim 7, wherein combining comprises maximum ratio combining or simple combining.

9. The method of claim 1, wherein the first signal is received by a first receiver device and the second signal is received by a second receiver device.

10. The method of claim 9, wherein the first signal and the second signal are transmitted by a single transmitter.

11. The method of claim 1, further comprising:
generating a channel matrix for the first signal; and
computing a matrix inverse of the channel matrix, wherein the first channel estimate is based at least in part on the matrix inverse.

12. The method of claim 11, wherein the channel matrix is based at least in part on an amplitude of the first signal.

13. The method of claim 11, wherein the channel matrix is based at least in part on a phase of the first signal.

14. The method of claim 1, wherein the first set of data subcarriers are at a first set of corresponding frequencies and the first set of pilot subcarriers are at a second set of corresponding frequencies, and wherein the second set of data subcarriers are at the first set of corresponding frequencies and the second set of pilot subcarriers are at the second set of corresponding frequencies.

15. A system comprising:
a receiver device configured to:
receive a first signal transmitted on a first communications, from a first antenna, path and a second signal transmitted, from a second antenna, on a second communications path, wherein the first signal includes a first set of data subcarriers and a first set of pilot subcarriers, and wherein the second signal includes a second set of data subcarriers and a second set of pilot subcarriers;

separate the first set of data subcarriers from the second set of data subcarriers and separate the first set of pilot subcarriers from the second set of pilot subcarriers according to a signal separating function, wherein the signal separating function is based on a first channel estimate for the first communications path and a second channel estimate for the second communications path; and match-filter combine at least one pilot subcarrier from the first set of pilot subcarriers with at least one pilot subcarrier of the second set of pilot subcarriers.

16. The system of claim 15, wherein the signal separating function comprises at least one of a zero forcing function or a minimum mean squared error function.

17. The system of claim 15, wherein the receiver device is configured to separate the first set of data subcarriers from the first set of pilot subcarriers, and to separate the second set of data subcarriers from the second set of pilot subcarriers.

18. The system of claim 15, wherein the receiver device is further configured to correct phase and jitter distortions in the first and second sets of data subcarriers based on the first and second sets of pilot subcarriers.

19. The system of claim 15, wherein the receiver device is further configured to combine each individual pilot subcarrier from the first set of pilot subcarriers with a corresponding individual pilot subcarrier from the second set of pilot subcarriers to create a set of combined pilot subcarriers, and wherein the receiver device is configured to phase-lock loop each combined pilot subcarrier of the set of combined pilot subcarriers.

20. The system of claim 19, wherein the receiver device is configured to combine individual pilot subcarriers of the first and second sets of pilot subcarriers according to a maximum ratio combine function or a simple combine function.

21. The system of claim 15, wherein the functionality performed by the receiver device is implemented in hardware, software, or a combination of hardware and software.

22. The system of claim 15, wherein the functionality of the receiver device is implemented in digital circuitry, analog circuitry, or a combination of digital and analog circuitry.

23. The system of claim 15, wherein the channel estimate for the first communications path is based on a first preamble of the first signal, and wherein the channel estimate for the second communications path is based on a second preamble of the second signal.

24. A system comprising:
means for receiving a plurality of signals, wherein the plurality of signals comprise a first signal transmitted on a first communications path from a first antenna to the means for receiving and a second signal transmitted on a second communications path from a second antenna to the receiving means, wherein the first signal includes a first set of data subcarriers at and a first set of pilot subcarriers, and wherein the second signal includes a second set of data subcarriers and a second set of pilot subcarriers;

means for separating the first set of data subcarriers from the second set of data subcarriers and for separating the first set of pilot subcarriers from the second set of pilot subcarriers according to a signal separating function, wherein the signal separating function is based on a first channel estimate for the first communications and a second channel estimate for the second communications path; and means for match-filter combining at least one pilot subcarrier of the first set of pilot subcarriers with at least one pilot subcarrier of the second set of pilot subcarriers.

25. A non-transitory computer-readable medium having instructions stored thereon, the instructions comprising:

instructions for receiving a first signal transmitted, from a first antenna, on a first communications path and a second signal transmitted, from a second antenna, on a second communications path, wherein the first signal includes a first set of data subcarriers and a first set of pilot subcarriers, and wherein the second signal includes a second set of data subcarriers and a second set of pilot subcarriers;

instructions for separating the first set of data subcarriers from the second set of data subcarriers and separating the first set of pilot subcarriers from the second set of pilot subcarriers according to a signal separating function, wherein the signal separating function is based on a first channel estimate for the first communications path and a second channel estimate for the second communications path; and instructions for match-filter combining at least one pilot subcarrier of the first set of pilot subcarriers with at least one pilot subcarrier of the second set of pilot subcarriers.

26. The non-transitory computer-readable medium of claim 25, further comprising:

instructions for separating the first set of data subcarriers from the first set of pilot subcarriers; and instructions for separating the second set of data subcarriers from the second set of pilot subcarriers.

27. The non-transitory computer-readable medium of claim 25, further comprising:

instructions for generating a channel matrix for the first signal, wherein the channel matrix is based at least in part on an amplitude and a phase of the first signal; and instructions for computing a matrix inverse of the channel matrix, wherein the first channel estimate is based at least in part on the matrix inverse.

28. The non-transitory computer-readable medium of claim 25, further comprising:

instructions for combining each individual pilot subcarrier from the first set of pilot subcarriers with a corresponding individual pilot subcarrier from the second set of pilot subcarriers to create a set of combined pilot subcarriers; and instructions for phase-lock looping each combined pilot subcarrier of the set of combined pilot subcarriers.

29. The non-transitory computer-readable medium of claim 25, further comprising instructions for correcting phase and jitter distortions in the first and second sets of data subcarriers based on the first and second sets of pilot subcarriers.

* * * * *

UNITED STATES PATENT AND TRADEMARK OFFICE
CERTIFICATE OF CORRECTION

| | | |
|---|---|---|
| PATENT NO. | : 8,139,544 B1 | Page 1 of 1 |
| APPLICATION NO. | : 11/121743 | |
| DATED | : March 20, 2012 | |
| INVENTOR(S) | : Webster et al. | |

It is certified that error appears in the above-identified patent and that said Letters Patent is hereby corrected as shown below:

In Column 4, Line 30, delete "UQ" and insert -- I/Q --, therefor.

In Column 12, Line 56, in Claim 24, delete "at and" and insert -- and --, therefor.

Signed and Sealed this
Fourteenth Day of August, 2012

David J. Kappos
*Director of the United States Patent and Trademark Office*